United States Patent
Seo

(10) Patent No.: US 8,104,685 B2
(45) Date of Patent: Jan. 31, 2012

(54) MULTI-FUNCTION MACHINE AND METHOD OF CONTROLLING THE SAME

(75) Inventor: Hyeon Seok Seo, Incheon (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 777 days.

(21) Appl. No.: 12/103,146

(22) Filed: Apr. 15, 2008

(65) Prior Publication Data
US 2009/0039146 A1    Feb. 12, 2009

(30) Foreign Application Priority Data
Aug. 6, 2007 (KR) ........................ 10-2007-0078441

(51) Int. Cl.
G01K 7/10 (2006.01)
G06K 9/36 (2006.01)
G06K 9/80 (2006.01)
G06F 3/12 (2006.01)
H04N 1/00 (2006.01)
(52) U.S. Cl. ............ 235/462.1; 358/1.13; 358/402
(58) Field of Classification Search .......... 235/375, 235/385, 462.01–462.49; 358/402, 474, 358/505, 537, 539, 1.13
See application file for complete search history.

(56) References Cited

U.S. PATENT DOCUMENTS

| | | | | |
|---|---|---|---|---|
| 4,980,721 A * | 12/1990 | Ishikawa et al. | ............. | 399/403 |
| 6,772,950 B2 * | 8/2004 | He | ................................ | 235/470 |
| 7,088,859 B1 * | 8/2006 | Yamaguchi et al. | .......... | 382/181 |
| 7,150,399 B2 * | 12/2006 | Barrus et al. | ............ | 235/462.01 |
| 7,523,864 B2 * | 4/2009 | Manheim | ................. | 235/462.01 |
| 2005/0195446 A1 * | 9/2005 | Kasatani | ........................ | 358/402 |
| 2006/0171513 A1 * | 8/2006 | Yoshida et al. | ............ | 379/88.13 |
| 2006/0187475 A1 * | 8/2006 | Fujioka | ............................ | 358/1.9 |
| 2006/0273177 A1 * | 12/2006 | Lee et al. | ................. | 235/462.01 |
| 2007/0076984 A1 * | 4/2007 | Takahashi et al. | ............ | 382/305 |
| 2007/0192335 A1 * | 8/2007 | Sugiura et al. | .................. | 707/10 |
| 2007/0211148 A1 * | 9/2007 | Lev et al. | ................. | 348/207.99 |

FOREIGN PATENT DOCUMENTS

| | | |
|---|---|---|
| CN | 1396538 | 2/2003 |
| CN | 1496093 | 5/2004 |
| CN | 1599488 | 3/2005 |
| CN | 1951099 | 4/2007 |
| JP | 2002-7246 | 1/2002 |
| KR | 2002-10458 | 2/2002 |

OTHER PUBLICATIONS

Chinese Office Action issued Feb. 5, 2010 in CN Application No. 2008101686910.
Chinese Office Action issued Oct. 12, 2010 in CN Application No. 200810168691.0.

* cited by examiner

*Primary Examiner* — Michael G Lee
*Assistant Examiner* — Suezu Ellis
(74) *Attorney, Agent, or Firm* — Stanzione & Kim, LLP

(57) ABSTRACT

A document including a two-dimensional barcode recorded therein is scanned, the two-dimensional barcode of the scan image is decoded, a text recorded in the document is extracted, the extracted text or a document produced by a document editing unit is attached to an e-mail, and the e-mail is transmitted. The text attached to the e-mail can be viewed at the side of a receiver. Since the document can be edited using at least one of the position, the size, the color and the arrangement of the text, readability of the text can be improved. Accordingly, it is possible to search the received text to easily find a desired document at the side of the receiver.

10 Claims, 7 Drawing Sheets

MULTI-FUNCTION MACHINE AND METHOD OF CONTROLLING THE SAME

CROSS-REFERENCE TO RELATED APPLICATIONS

This application claims priority under 35 U.S.C. §119(a) from Korean Patent Application No. 2007-78441, filed on Aug. 6, 2007 in the Korean Intellectual Property Office, the disclosure of which is incorporated herein in its entirety by reference.

BACKGROUND OF THE INVENTION

1. Field of the Invention

The present general inventive concept relates to a multi-function apparatus having an improved "scan to e-mail" function to attach a scan image document to an e-mail and to transmit the e-mail and a method of controlling the same.

2. Description of the Related Art

A conventional multi-function machine indicates a multi-function terminal including a combination of a plurality of devices such as a facsimile apparatus, a printer, etc., and includes a personal computer (PC) interface function to allow a user to interface with a personal computer. Recently, the multi-function machine performs a copying function which is a combination of a scanning function and a printing function, in addition to a printing function, a scanning function and a facsimile function. The conventional multi-function machine also performs a "scan to e-mail" function to attach a scan image to an e-mail and then transmits the e-mail to a user.

In the conventional multi-function machine including a "scan to e-mail" function, the user prepares several pages of image documents to be transmitted via an e-mail. When several pages of image documents are loaded on an auto document feeder (ADF) and a user command to transmit the e-mail is input by the user, the documents which are automatically fed are sequentially scanned, a scan image document is attached to the e-mail, and the email attached with the scan image document is transmitted.

A general document may include a background, an image and text. When a scan image document is transmitted via an e-mail, at the side of a receiver, the received image document is opened using an application program according to a file format of the image document attached to the e-mail so as to read the contents of the document.

Since the text is converted into an image in the received image document, readability of the text, which is converted into the image in the received document, may deteriorate if the document is not scanned with high scan resolution, that is, if the document is scanned with low scan resolution. In addition, since the text is converted into the image, the text is not searchable and an editing function to change the text cannot be performed.

If the document is scanned with high scan resolution at the side of a transmitter to transmit the document via the e-mail, the readability of the document can be improved. However, as the resolution is increased, a scan speed is decreased. Accordingly, a time necessary to transmit the e-mail is increased. In addition, even in this method, since the text is converted into the image, at the side of the receiver, it is impossible to perform a searching function to easily search for a desired text in several pages of image documents.

SUMMARY OF THE INVENTION

The present general inventive concept provides a multi-function apparatus capable of extracting a text from a scan image and transmitting the text via an e-mail, and a method of controlling the same.

The present general inventive concept also provides a multi-function apparatus capable of improving a "scan to e-mail" function and improving readability of a text included in a document, and a method of controlling the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a multi-function apparatus including a scan device to scan a document and output a scan image, a barcode decoding unit to decode a barcode included in the scan image, extract a text included in the document, and output the extracted text, a document editing unit which includes at least one of the scan image and the extracted text in a document and produces the document, and an e-mail transmitting unit to attach the text extracted by the barcode decoding unit or the document produced by the document editing unit to an e-mail and transmit the e-mail.

The multi-function apparatus may further include a control unit to set scan resolution of the scan device according to a plurality of modes to transmit the extracted text via the e-mail either separately or together with the scan image.

The multi-function apparatus may further include an operation panel unit to allow a user to set any one of the plurality of modes or manually set the scan resolution.

The barcode decoding unit may decode a two-dimensional barcode recorded in the document.

The two-dimensional barcode may include the same information as the text of the document and further include additional information related to the text.

The scan device may include a scanning unit to scan the document according to a scan speed set by the control unit, a scan buffer to store the scan image, and an image processing unit to perform an image enhancement process with respect to the scan image, detect the position of the barcode from the scan image, and supply the barcode to the barcode decoding unit.

The document editing unit may edit the document using at least one of the position, the size, the color and the arrangement of the text according to edit information decoded by the barcode decoding unit.

A format of the document edited by the document editing unit may be a portable document format (PDF) or a hypertext markup language (HTML).

The foregoing and/or other aspects and utilities of the present general inventive concept may also be achieved by providing a method of controlling a multi-function apparatus to transmit a scan image scanned using a scan device via an e-mail, the method including scanning a document including a barcode recorded therein and outputting the scan image including a background and an image, decoding the barcode and extracting a text included in the document; including at least one of the scan image and the extracted text in a document and editing the document, and attaching only the extracted text to the e-mail or the edited document including the scan image and the extracted text to the e-mail and transmitting the e-mail.

The method may further include setting scan resolution of the scan device, the scan resolution may include first scan resolution which is applied when only the text recorded in the document is extracted and second scan resolution which is applied when the image recorded in the document is scanned, and the first scan resolution may be set to be lower than the second scan resolution.

The barcode may be a two-dimensional barcode, the two-dimensional barcode may include the same information as the text of the document, and may further include additional information related to the text.

The editing of the document may include editing the document using at least one of the position, the size, the color and the arrangement of the text according to decoded edit information.

The foregoing and/or other aspects and utilities of the present general inventive concept may also be achieved by providing a multi-function apparatus to scan and transmit an image of a document, including a control unit to allow a user to set a scan resolution of the multi-function apparatus, a scanning device to scan a document with the set scan resolution and output a scanned image including a barcode, and a divided-image processing device to generate a string corresponding to information encoded on the barcode and to output the string to an e-mail server.

The divided-image processing device may include a barcode decoding unit to decode the barcode and extract text corresponding to the decoded barcode, and a document editing unit to receive the extracted text and generate the string based on the extracted text to be output to the e-mail server.

The divided-image processing device may further include an image compressing unit to compress a non-text image scanned by the scanning unit and to output the compressed non-text image to the document editing unit, such that the document editing unit produces another document comprising the string and the compressed non-text image and outputs the another document to the e-mail server.

The multi-function apparatus may further include an operation panel unit to allow the user to select a transmission mode of the scanned image with regard to the selected resolution.

The multi-function apparatus may further include an e-mail transmitting unit to attach the text extracted by the barcode decoding unit to an e-mail and transmit the e-mail to the e-mail server according to a first selected transmission mode.

The multi-function apparatus may further include an image compressing unit to compress a non-text image scanned by the scanning unit, such that the e-mail transmitting unit attaches the text extracted by the barcode decoding unit and the compressed non-text image to an e-mail and transmits the e-mail to an e-mail server according to a second selected transmission mode.

The document editing unit may edit the text extracted from the barcode decoding unit using additional information in the barcode.

The additional information may include a size and a color of the text.

The scan resolution may be set to a low level if there is only text data in the scanned image; and the scan resolution may be set to a high level if there is non-text image data in the scanned image.

The foregoing and/or other aspects and utilities of the present general inventive concept may also be achieved by providing a method of controlling a multi-function apparatus to transmit a scan image scanned using a scan device via an e-mail, the method comprising: setting a scan resolution of the multi-function apparatus, scanning a document with the set scan resolution, outputting a scanned image including a barcode, generating a string corresponding to information encoded on the barcode, and outputting the string to an e-mail server.

The method may further include decoding the barcode, extracting text corresponding to the decoded barcode, and generating the string to be output to the e-mail server based on the extracted text.

The method may further include compressing a non-text image scanned by the scanning unit, producing another document comprising the string and the compressed non-text image, and outputting the another document to the e-mail server.

The foregoing and/or other aspects and utilities of the present general inventive concept may also be achieved by providing a computer readable recording medium having embodied thereon a computer program to execute a method, wherein the method includes setting a scan resolution of the multi-function apparatus, scanning a document with the set scan resolution, outputting a scanned image including a barcode, generating a string corresponding to information encoded on the barcode, and outputting the string to an e-mail server.

BRIEF DESCRIPTION OF THE DRAWINGS

These and/or other aspects utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
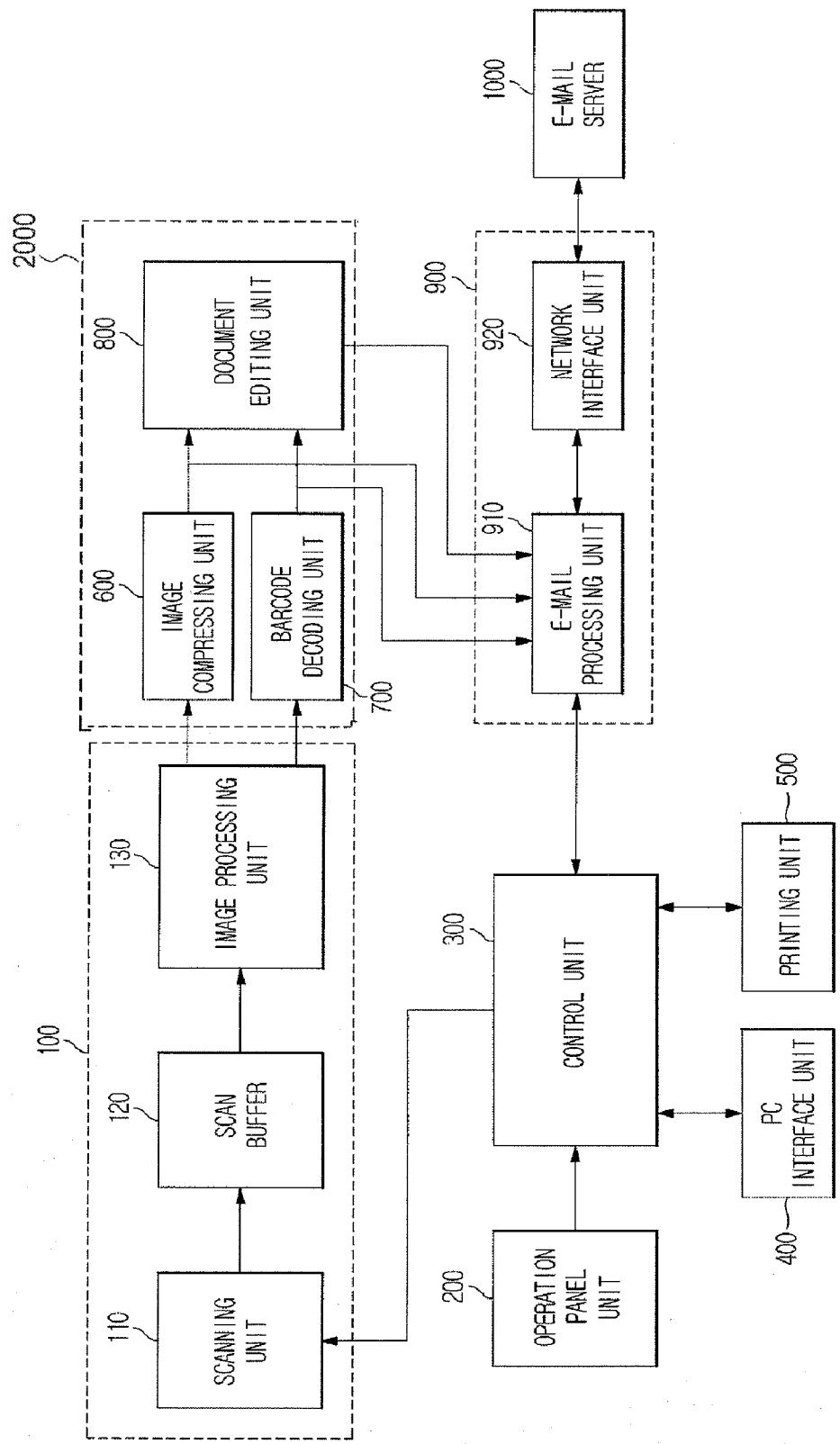
FIG. 1 is a block diagram illustrating a multi-function apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Figure 6A:
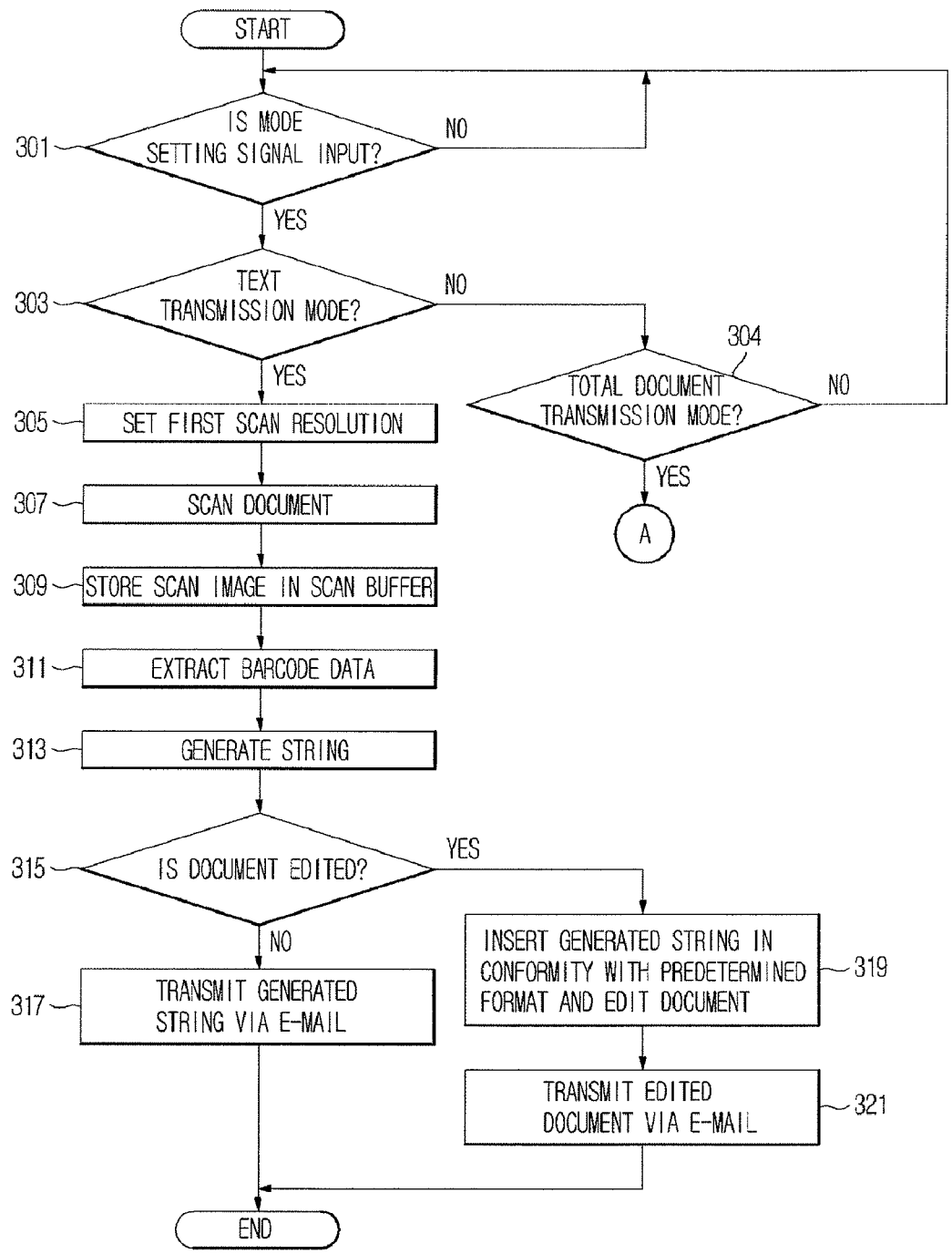
FIGS. 6A and 6B are flowcharts illustrating a method of controlling the multi-function apparatus according to an embodiment of the present general inventive concept.
Figure 6B:
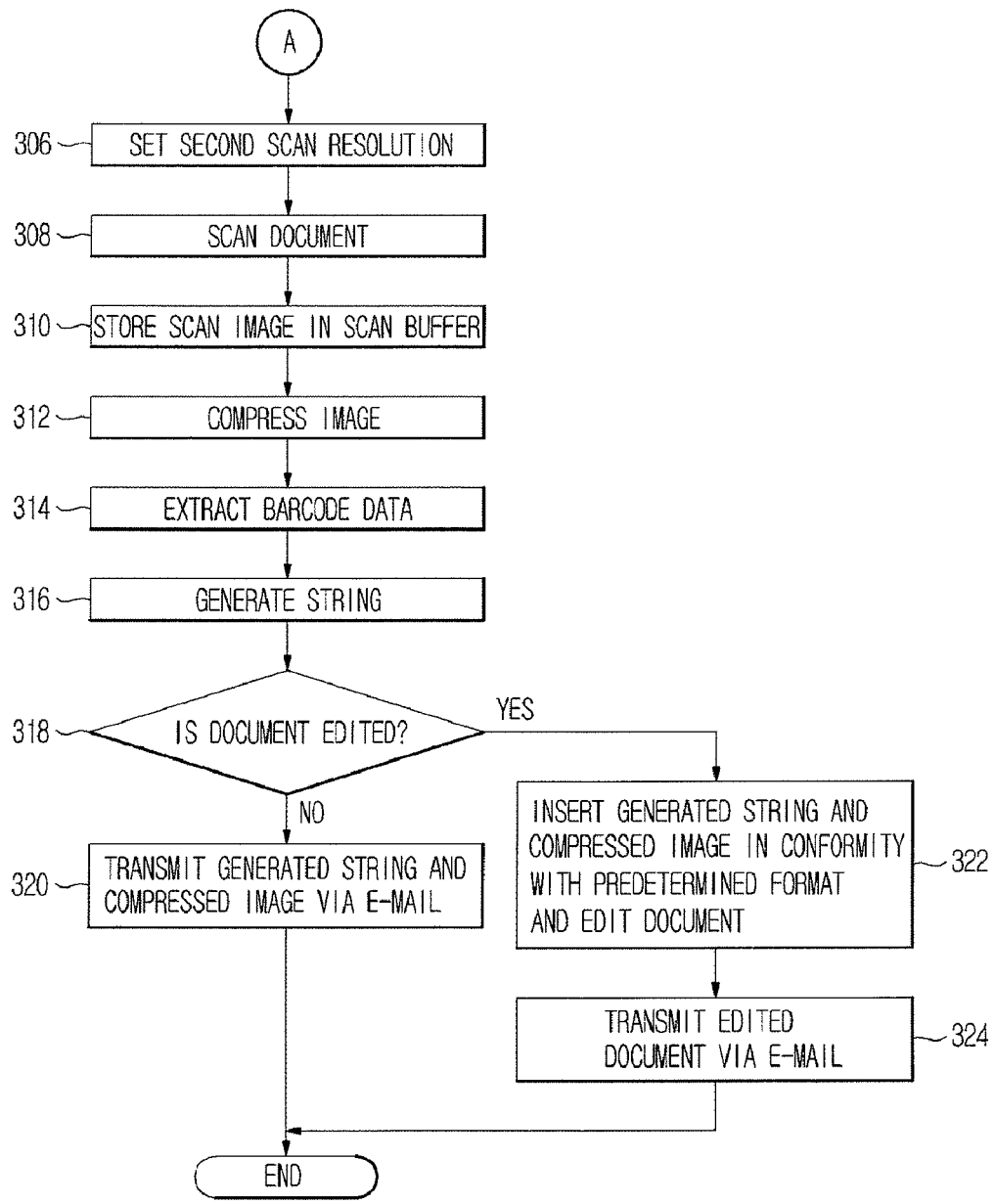

Hereinafter, a multi-function apparatus of FIG. 1 and a method of controlling the same as illustrated in FIGS. 6A and 6B according to an embodiment of the present general inventive concept will be described.

The multi-function apparatus of FIG. 1 includes a "scan to e-mail" function.

Although, in the present embodiment, an image and a text are both included in a document, only the image may be included in the document or only the text may be included in the document.

According to the present embodiment, a document including a two-dimensional barcode is scanned. Here, the two-dimensional barcode includes the same information as the text of the document. The two-dimensional barcode may further include additional information related to the text.

In the multi-function apparatus according to the present embodiment, which extracts a text from a scan image, attaches the text to an e-mail together with a scan image document and transmits the e-mail, the two-dimensional barcode is included in order to extract the text. Accordingly, if only the image is included in the document, the two-dimensional barcode may not be included.

As illustrated in FIG. 1, the multi-function apparatus according to an embodiment of the present general inventive concept includes a scanning device 100, an operation panel unit 200, a control unit 300, a PC interface unit 400, a printing unit 500, an image compressing unit 600, a barcode decoding unit 700, a document editing unit 800, and an e-mail transmitting unit 900.

The scanning device 100 includes a scanning unit 110, a scan buffer 120 and an image processing unit 130. The scanning unit 110 scans a document and acquires a scan image. The scan image may include text and a graphic image. The scanning unit 110 scans a background and an image of the document using an image sensor. The image sensor may include a charge coupled device (CCD) or a contact image sensor (CIS).

Documents are automatically fed to the scanning device 100 by an auto document feeder (ADF) (not illustrated) one by one, and the scanning unit 110 scans the documents.

Figure 2:
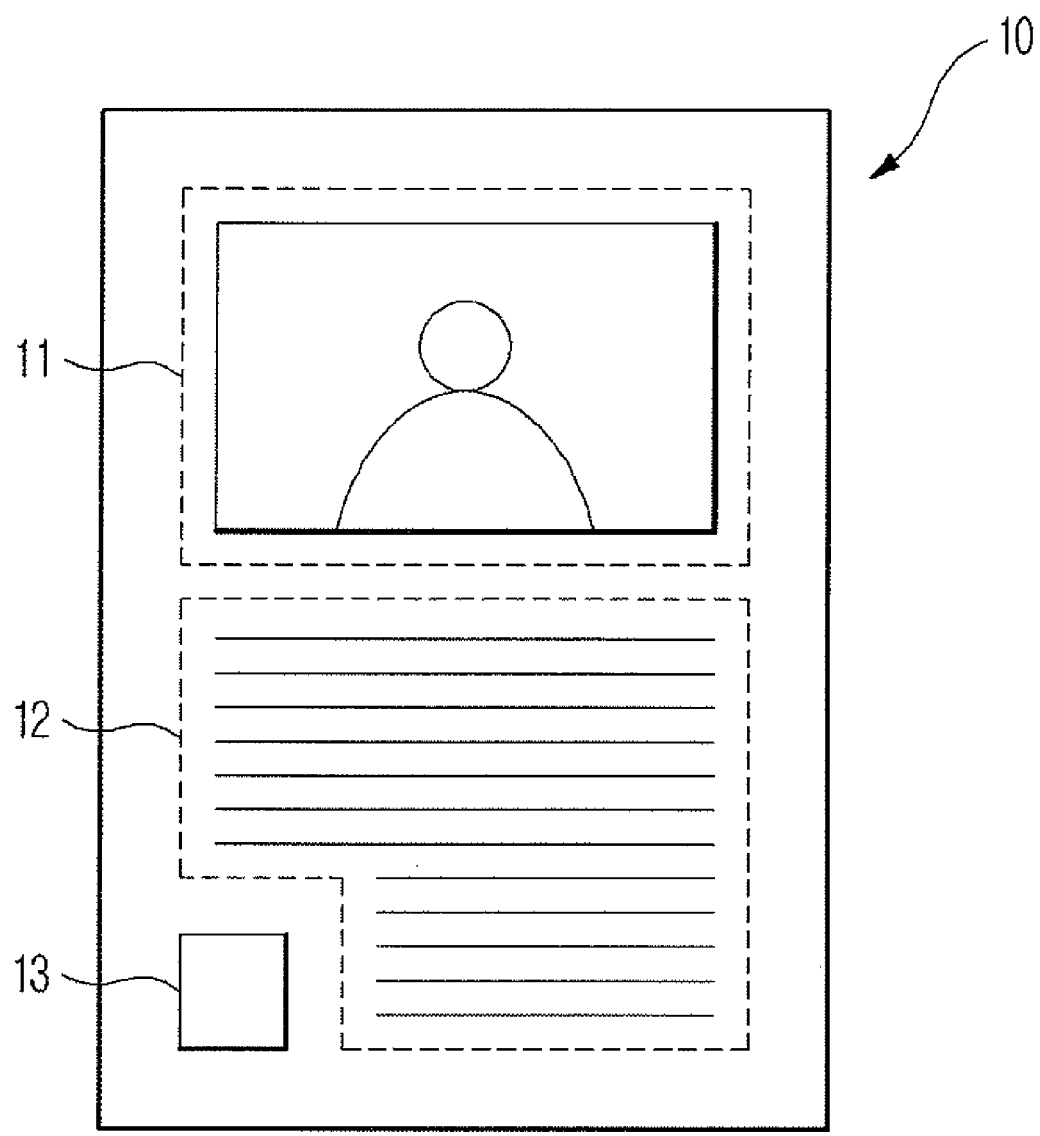
FIG. 2 is a view illustrating a layout of a document according to an embodiment of the present general inventive concept.

As illustrated in FIG. 2, a document 10 includes a first region 11 including an image, a second region 12 including a text, and a barcode 13 including the same information as the text of the second region 12 and additional information. The barcode 13 may have a data format of a two-dimensional barcode 13 which will be described below with reference to FIG. 5.

Alternatively, a document may include only a background and an image or only a text. A scan method, that is, a method to change a scan resolution, may vary according to a type of the document. For example, with respect to the document including only the text, the text can be restored using an operation to decode a barcode with a relatively low resolution which is just enough to decode a two-dimensional barcode. That is, since high resolution is not required, a scan time does not need to be increased. However, the scan resolution should not be decreased when the document includes an image. Accordingly, a resolution to scan a document including only text may be set to a comparatively low level to recognize the two-dimensional barcode, and the document is then scanned.

Referring to FIG. 1, a scan resolution of the scanning unit 110 is set under the control of the control unit 300. The control unit 300 may control the scanning unit 110 such that a user may select any one of a plurality of scan resolution modes related to "scan to e-mail" transmission through the operation panel unit 200, so as to set the scan resolution according to the selected mode. Alternatively, a user may manually set the scan resolution according to guide information provided by the operation panel unit 200, and the control unit 300 may control the scanning unit 110 according to the setting operation. The plurality of scan resolution modes may include a mode to scan a document having a combination of an image, a text, and the barcode. According to the combination, the mode is selected and the resolution is set according to the selected mode.

The scan buffer 120 temporarily stores the scan image of the document received from the scanning unit 110 and supplies the scan image to the image processing unit 130.

The image processing unit 130 performs an image enhancement process of making characters of the scan image clear or processing a background image.

The image processing unit 130 filters the scan image, which is temporarily stored in the scan buffer 120, and recognizes a position of a memory region corresponding to the two-dimensional barcode. The two-dimensional barcode 13 may have a predetermined shape, such as a rectangular shape as illustrated in FIG. 2, such that the position of the memory region can be detected by filtering even when the two-dimensional barcode 13 is converted into the scan image.

The image processing unit 130 sends the image, which is subjected to the image enhancement process, of the scan image to the image compressing unit 600 and sends the two-dimensional barcode of the scan image to the barcode decoding unit 700.

The image compressing unit 600 compresses the background and the image received from the image processing unit 130 in conformity with a compression method of reducing an amount of transmitted data and supplies the compressed background and image to the document editing unit 800. The image compressing unit 600 also supplies the compressed background and image to the e-mail transmitting unit 900 such that the background and image are attached to an e-mail without converting the compressed background and image into a document format.

The barcode decoding unit 700 decodes the two-dimensional barcode received from the image processing unit 130, generates a string corresponding to the text of the document, and supplies the generated string to the document editing unit 800. The barcode decoding unit 700 also supplies the generated string to the e-mail transmitting unit 900 such that the string is attached to the e-mail without converting the generated string into a document format.

The document editing unit 800 edits a new document using the compressed background and image received from the image compressing unit 600 or the string received from the barcode decoding unit 700 and supplies the edited document to the e-mail transmitting unit 900.

Figure 3:
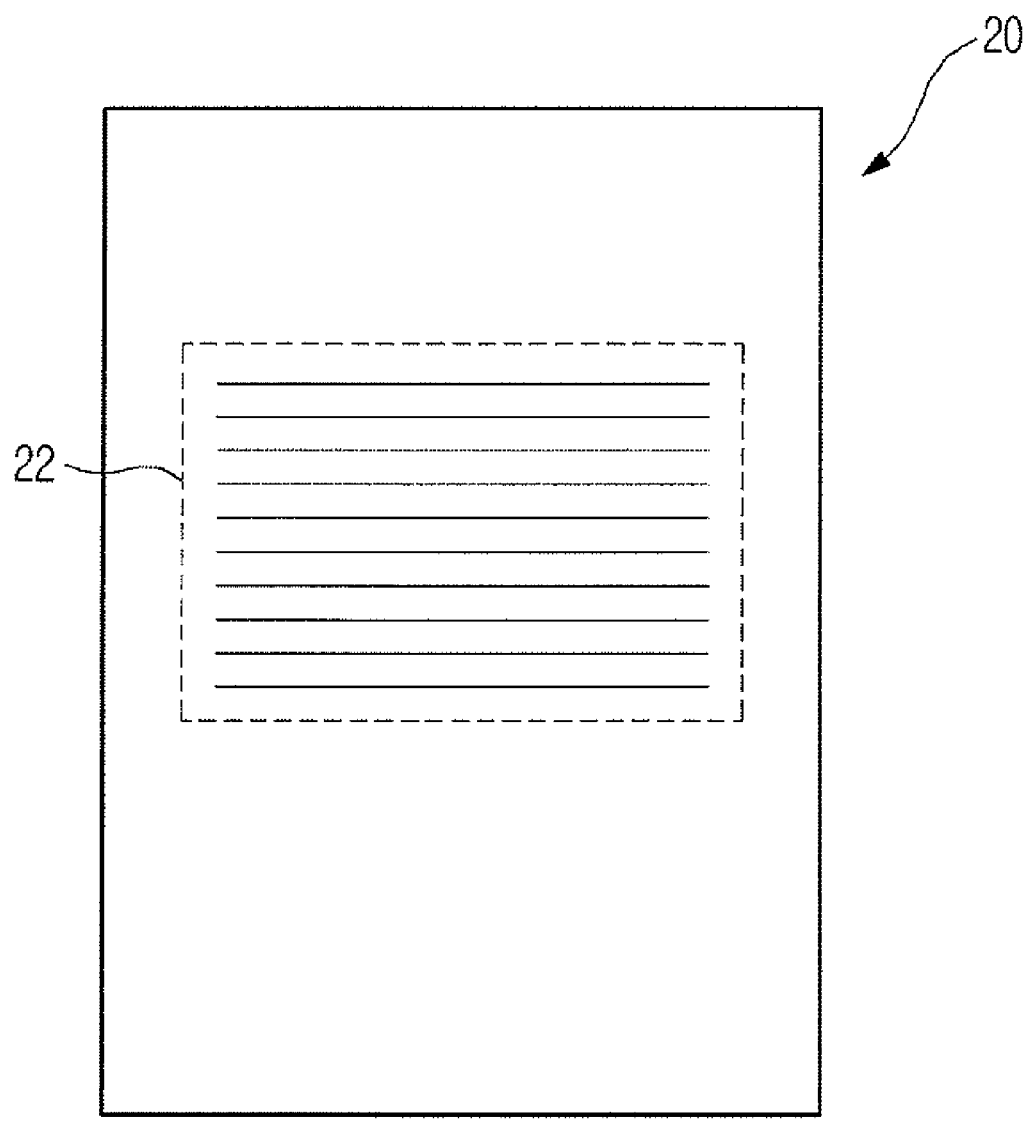
FIG. 3 is a view illustrating a layout of a document, which is edited using a string generated by decoding a barcode, by a document editing unit according to an embodiment of the present general inventive concept.

As illustrated in FIG. 3, the document editing unit 800 may generate a newly edited document 20 using the string generated by the barcode decoding unit 700. Here, information on a position of a string region 22 in which the string is displayed in the document 20 is included in the information added to the two-dimensional barcode 13.

Figure 4:
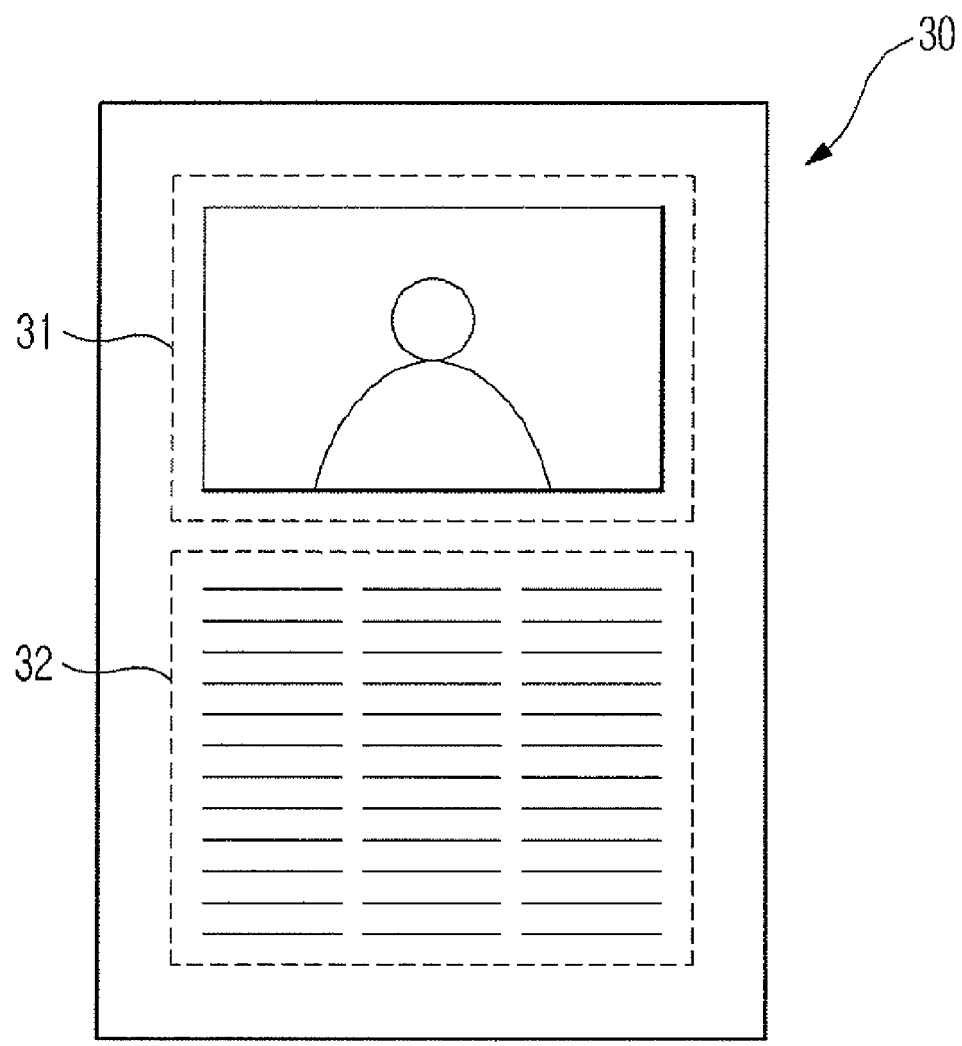
FIG. 4 is a view illustrating a layout of a document, which is edited using a string generated by decoding a barcode and a compressed image, by the document editing unit according to an embodiment of the present general inventive concept.

Alternatively, as illustrated in FIG. 4, the document editing unit 800 may generate a newly edited document 30 using the background and image compressed by the image compressing unit 600 and the string generated by the barcode decoding unit 700. Here, information on a position of an image region 31, in which an image displayed in the document 30, information on the position of a string region 32, in which the string is displayed, and edit information of a display form of the string of the string region 32, in which the string is displayed, are included in information added to the two-dimensional barcode 13.

A format of the edited document generated by the document editing unit 800 may be a portable document format (PDF) or a hypertext markup language (HTML). The image compressing unit 600, the barcode decoding unit 700, and the document editing unit 800 may all comprise a divided-image processing device 2000.

Figure 5:
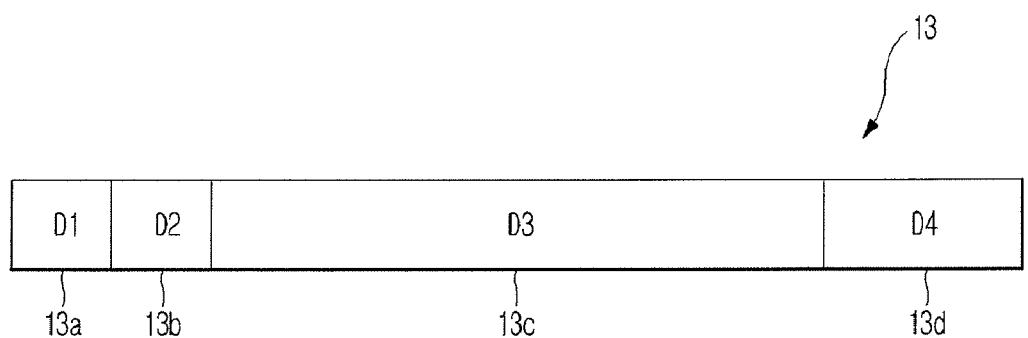
FIG. 5 is a view illustrating a data format of a barcode according to an embodiment of the present general inventive concept.

FIG. 5 is a view illustrating a data format of the barcode according to an embodiment of the present general inventive concept.

As illustrated in FIG. 5, the two-dimensional barcode 13 includes a first data portion 13a including information to set a size and a color of a text, a second data portion 13b including information on an arrangement form at the time of editing the text, a third data portion 13c including information on the contents of the text, and a fourth data portion 13d including information such as a code and a document number to identify a document. For convenience of description, the configuration of the data format is simplified in the present embodiment. It is apparent to those skilled in the art that additional information may be added or the information may be selectively deleted if necessary (i.e., length of the text, font type, special character sets, etc.), and thus a detailed description thereof will be omitted. Although the configuration of the data format is changed, the text should be included.

The e-mail transmitting unit 900 attaches the string generated by extracting the text from the scan image to an e-mail or a newly edited document including the compressed background and image and the generated string to an e-mail and transmits the e-mail, while under the control of the control unit 300. That is, an e-mail processing unit 910 attaches a file of the string generated by the barcode decoding unit 700 or a file of the document edited by the document editing unit 800 to the e-mail and transmits the e-mail to an e-mail server 1000 (also called a simple mail transfer protocol (SMTP) server) through a network interface unit 920.

The PC interface unit 400 performs an interface operation to interface with the personal computer (not illustrated) and the printing unit 500 prints the scan image or information received from the personal computer on a printing medium, both of which are not directly related to the operation of the present embodiment, and thus, a description thereof will be omitted.

Hereinafter, a method of controlling the multi-function apparatus according to an embodiment of the present general inventive concept will be described with reference to FIGS. 6A and 6B.

First, when power is supplied to the multi-function apparatus of FIG. 1, the control unit 300 determines whether a user mode setting signal is input through the operation panel unit 200 in operation 301. Here, the user may set a desired mode among a variety of modes to perform the "scan to e-mail" function with respect to a document. The variety of modes may include a case where a text extracted from a scan image is directly transmitted via an e-mail or is edited to a document and transmitted via an e-mail, and a case where an image of a scan image is compressed and the compressed image and the extracted text are directly transmitted via an e-mail or are edited to a document and transmitted via an e-mail.

If it is determined that the mode setting signal is input in operation 301, the control unit 300 determines whether a text transmission mode is set in operation 303. If it is determined that the text transmission mode is set, the control unit 300 outputs a resolution setting signal to set a first scan resolution to the scanning unit 110 according to the text transmission mode in operation 305.

The scanning unit 110 scans the document according to the first scan resolution and transmits the scan image to the scan buffer 120 in operation 307. The scan buffer 120 stores the scan image in operation 309. The image processing unit 130 filters the scan image stored in the scan buffer 120, detects the position of the barcode, extracts barcode data, and sends the barcode data to the barcode decoding unit 700 in operation 311. The barcode decoding unit 700 decodes the barcode and generates a string corresponding to the text in operation 313.

Next, the control unit 300 determines whether a document editing function is set in operation 315. If it is determined that the document editing function is not set, the e-mail processing unit 910 attaches a file of the generated string to an e-mail and transmits the e-mail to the e-mail server 100 via the network interface unit 920 in operation 317.

If it is determined that the document editing function is set in operation 315, then the document editing unit 800 inserts the generated string in conformity with a predetermined format, such as a portable document format (PDF) or a hypertext markup language (HTML), and edits the document. At this time, the edit information of the text is obtained from additional information included in the two-dimensional barcode, and the additional information may include a size and a color of the text at a time of editing the document in operation 319.

Next, the e-mail processing unit 910 attaches a file of the document edited by the document editing unit 800 to an e-mail and transmits the e-mail to the e-mail server 1000 via the network interface unit 920 in operation 321.

If it is determined that the text transmission mode is not set in operation 303, then it is determined whether a total transmission mode is set in operation 304. If it is determined that the total transmission mode is set, then the control unit 300 outputs a resolution setting signal to set second scan resolution which is significantly higher than the first scan resolution to the scanning unit 110 in operation 306. If it is determined that the total transmission mode is not set, then it is again determined whether a user mode setting signal is input through the operation panel unit 200 in operation 301.

The scanning unit 110 scans the document according to the second scan resolution and transmits the scan image to the scan buffer 120 in operation 308. The scan buffer 120 stores the scan image in operation 310. The image processing unit 130 sends an image, which is subjected to an image enhancement process, of the stored scan image to the image compressing unit 600 so as to compress the image in operation 312. The image processing unit 130 filters the scan image stored in the scan buffer 120, detects the position of the barcode, extracts barcode data, and sends the barcode data to the barcode decoding unit 700 in operation 314. The barcode decoding unit 700 decodes the barcode and generates a string corresponding to the text in operation 316.

Next, the control unit 300 determines whether a document editing function is set in operation 318. If it is determined that the document editing function is not set, then the e-mail processing unit 910 attaches a file of the generated string and the compressed image to an e-mail and transmits the e-mail to the e-mail server 100 via the network interface unit 920 in operation 320.

If it is determined that the document editing function is set in operation 318, then the document editing unit 800 inserts the generated string and the compressed image in conformity with a predetermined format such as a PDF or a HTML, and edits the document. At this time, the edit information of the text is obtained from additional information included in the two-dimensional barcode in operation 322.

Next, the e-mail processing unit 910 attaches a file of the document edited by the document editing unit 800 to an e-mail, and transmits the e-mail to the e-mail server 1000 via the network interface unit 920 in operation 324.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to an embodiment the present general inventive concept, since a "scan to e-mail" function is improved such that a text extracted from a scan image is transmitted via an e-mail either separately or together with an image, the text attached to an e-mail can be viewed by a user receiving the e-mail, and thus readability of the text can be improved.

Since a size and the color of the text can be set in the edited document, the readability of the edited document attached to the e-mail received by the receiver can be improved.

When only the text is extracted from the scan image and is transmitted via the e-mail, the scan resolution of the scan device can be set to be low enough to recognize the two-dimensional barcode including the text. Accordingly, it is possible to reduce a time necessary to transmit the e-mail. The receiver can search the text and thus easily find a desired document.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-function apparatus, comprising:
    a scan device to scan a document having a text and a barcode and to output a scan image of the document, wherein the barcode includes information of the text of the document;
    a barcode decoding unit to decode the barcode included in the scan image, to extract the text of the document from the barcode, and to output the extracted text;
    a document editing unit to include at least one of the scan image and the extracted text in another document and to produce the another document;
    an e-mail transmitting unit to attach the text extracted by the barcode decoding unit or the another document produced by the document editing unit to an e-mail and transmit the e-mail; and
    a control unit to set a scan resolution of the scan device according to one of a plurality of modes, wherein the plurality of modes include a first mode to transmit the extracted text via the e-mail without the scan image and a second mode to transmit the extracted text via the e-mail together with the scan image.

2. The multi-function apparatus of claim 1, further comprising:
    an operation panel unit to allow a user to set any one of the plurality of modes or manually set the scan resolution.

3. The multi-function apparatus of claim 1, wherein the barcode is a two-dimensional barcode recorded in the document.

4. The multi-function apparatus of claim 3, wherein the two-dimensional barcode includes the same information as the text of the document and further includes additional information related to the text.

5. The multi-function apparatus of claim 1, wherein the scan device includes a scanning unit to scan the document according to a scan speed set by a control unit, a scan buffer to store the scan image, and an image processing unit to perform an image enhancement process with respect to the scan image, to detect the position of the barcode from the scan image, and to supply the barcode to the barcode decoding unit.

6. The multi-function apparatus of claim 1, wherein the barcode includes edit information of the document and the document editing unit edits the another document using at least one of a position, a size, a color and an arrangement of the text according to edit information decoded by the barcode decoding unit.

7. The multi-function apparatus of claim 1, wherein a format of the another document edited by the document editing unit is a portable document format (PDF) or a hypertext markup language (HTML).

8. A method of controlling a multi-function apparatus to transmit a scan image scanned using a scan device via an e-mail, the method comprising:
    scanning a document including a text and a barcode recorded therein and outputting the scan image of the document including a background and an image, wherein the barcode includes information of the text of the document;
    decoding the barcode and extracting the text of the document from the barcode;
    including at least one of the scan image and the extracted text in a new document and editing the new document;
    attaching only the extracted text to the e-mail or attaching the edited new document to the e-mail and transmitting the e-mail; and
    setting a scan resolution of the scan device, wherein the scan resolution of the scan device is set according to one of a plurality of modes, wherein the plurality of modes include a first mode to transmit the extracted text via the e-mail without the scan image and a second mode to transmit the extracted text via the e-mail together with the scan image.

9. The method of claim 8, wherein the barcode is a two-dimensional barcode which includes the same information as the text of the document, and further includes additional information related to the text.

10. The method of claim 8, wherein the barcode includes edit information of the document and the editing of the new document includes editing the new document using at least one of a position, a size, a color and an arrangement of the text according to decoded edit information.

* * * * *